UNITED STATES PATENT OFFICE.

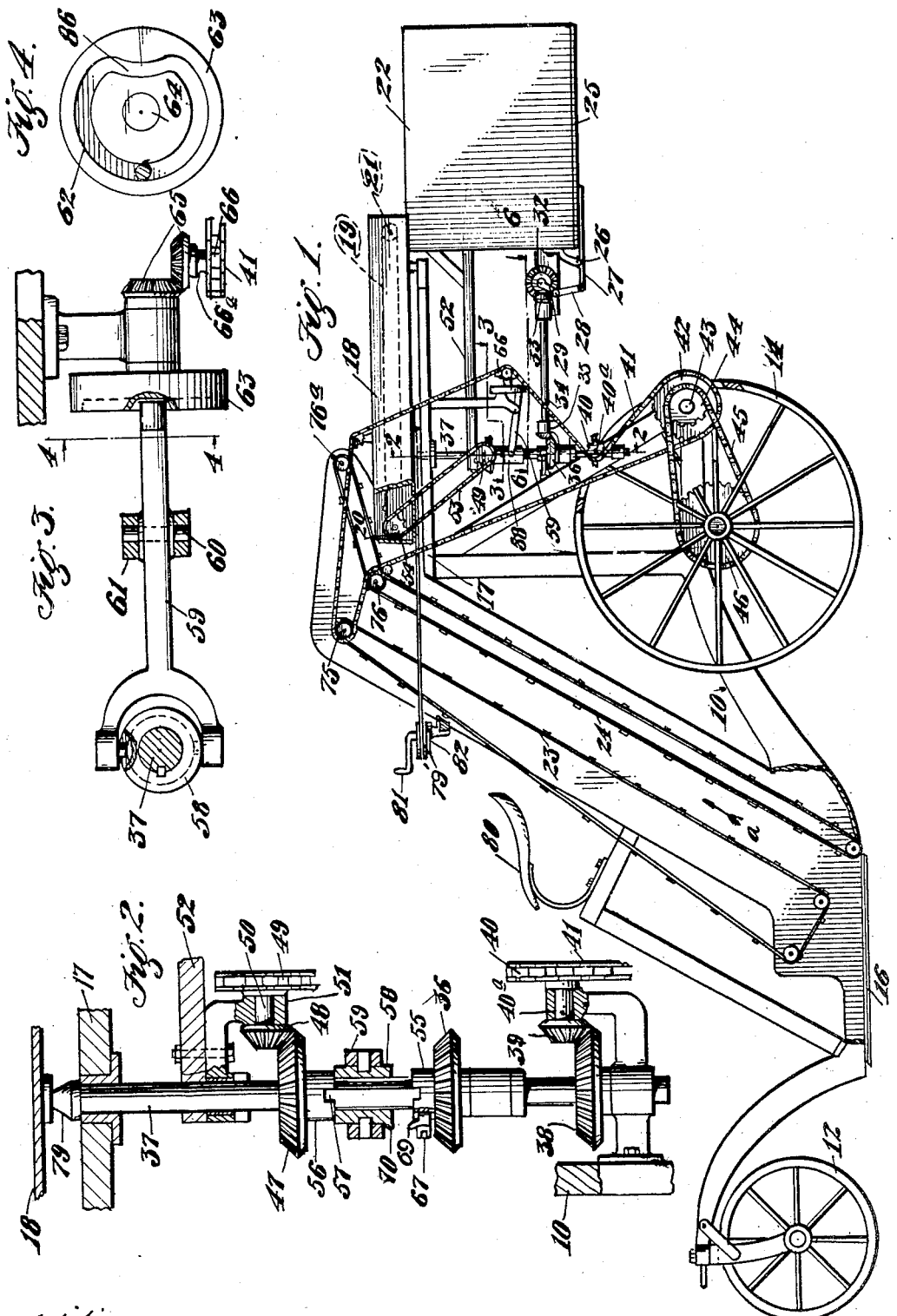

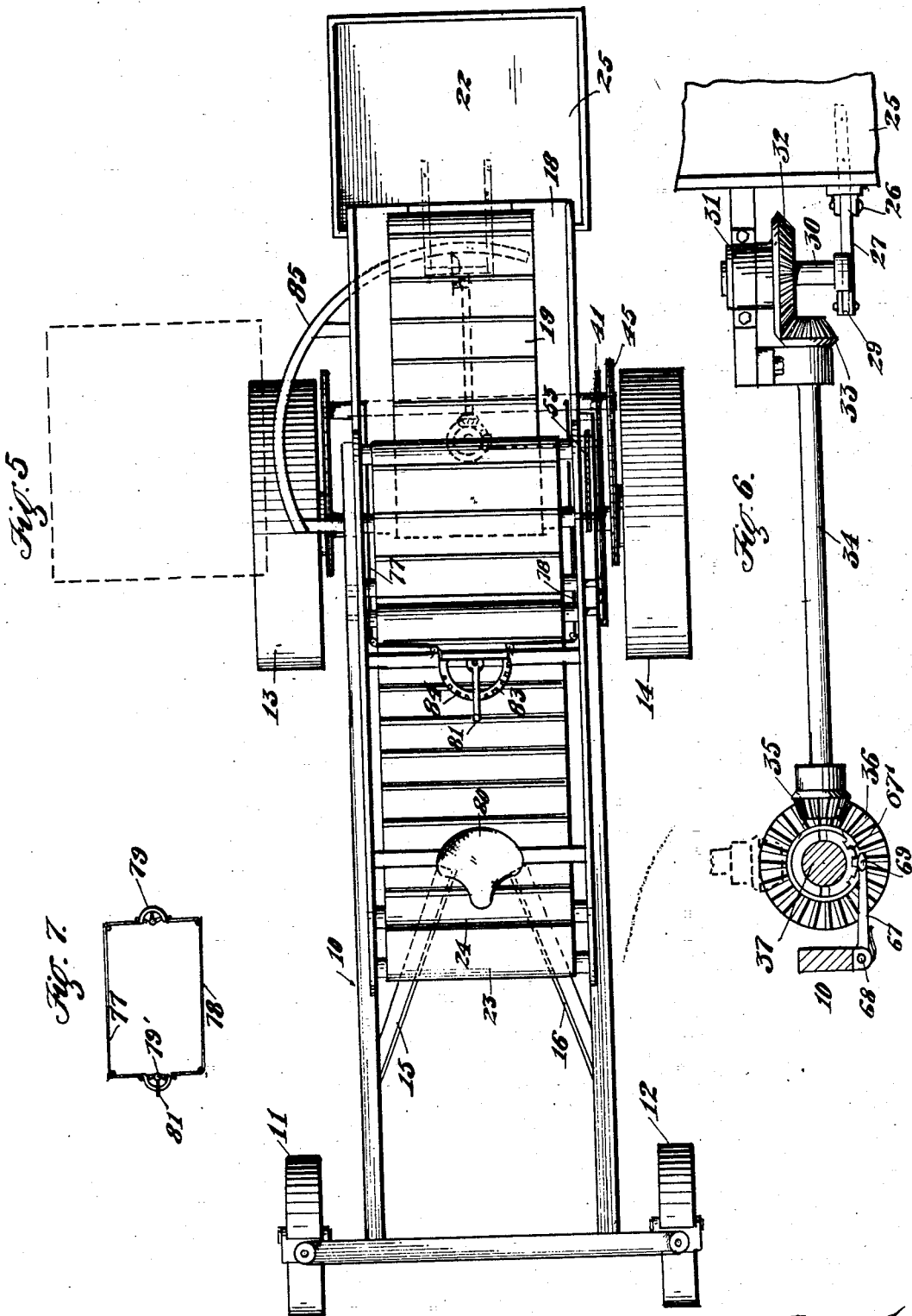

MARTIN L. BOYD, OF ZELZAH, CALIFORNIA.

BEAN-HARVESTER.

1,177,475.  Specification of Letters Patent.  Patented Mar. 28, 1916.

Application filed February 3, 1915. Serial No. 5,880.

*To all whom it may concern:*

Be it known that I, MARTIN L. BOYD, a citizen of the United States, residing at Zelzah, in the county of Los Angeles, State of California, have invented new and useful Improvements in Bean-Harvesters, of which the following is a specification.

This invention relates to a bean harvester.

It is the object of this invention to provide a machine for harvesting beans by means of which the bean stalks are severed and stacked, and by which the stacks may be formed at intervals rearward of the machine during its progress by delivering the stalks rearward thereof, and which is so constructed that after the machine has traversed one row and is returned on an adjacent row, the beans harvested from the latter row may be stacked in the same row with the former row as on the piles previously formed.

Another object is to provide a harvester with a laterally-swinging stacking hopper adapted to be adjusted in various positions, with means for delivering the bean severed by the machine to the hopper in any of its adjusted positions.

Another object is to provide means for shifting the hopper into any desired position within its range of movement, and to provide mechanical means for automatically discharging the hopper in any of its positions.

A further object is to provide means for automatically discharging the hopper at predetermined distances of travel of the harvester.

The invention is illustrated in the accompanying drawing, in which:

Figure 1 is a view of the harvester in side elevation with parts broken away, showing the stacking hopper as extending rearwardly thereof. Fig. 2 is an enlarged detail section and elevation on the line 2—2 of Fig. 1, as seen in the direction indicated by the arrows. Fig. 3 is an enlarged detail section and plan view on the line 3—3 of Fig. 1, showing the hopper discharge controlling cam and the clutch controlled thereby. Fig. 4 is a section in elevation on the line 4—4 of Fig. 3, as seen in the direction indicated by the arrow, illustrating the formation of a cam. Fig. 5 is a plan view of the harvester. Fig. 6 is an enlarged horizontal section and plan view on the line 6—6 of Fig. 1, showing the hopper discharging mechanism. Fig. 7 is a detail in plan illustrating the mechanism for swinging the stacking hopper.

More specifically, 10 indicates the frame of the harvester which is mounted on any suitable running gear, here shown as consisting of a pair of forward wheels 11 and 12 and rear wheels 13 and 14. The frame 10 is formed with a downwardly extending portion carrying a pair of horizontally extending, diagonally-arranged cutting blades 15 and 16 which converge toward each other, and are adapted to sever the stalks of a plurality of rows of beans as the harvester is advanced. The frame 10 is formed with a horizontally-extending rigid portion 17 arranged above the wheels 13 and 14 and extending rearwardly thereof.

Pivotally mounted on the rigid frame 17 as particularly shown in Fig. 2 is a swinging frame 18 which carries a horizontally-extending conveyer belt 19, supported on suitable rolls or sprockets 20 and 21, carried by the swinging frame 18. Secured to the outer end of the swinging frame 18 and depending therefrom is a hopper 22, into which the stalks delivered to the belt 19 are discharged; the stalks being delivered to the belt 19 by means of a pair of conveyer belts 23 and 24, carried on suitable rolls mounted on the frame 10 and extending upwardly from the rear ends of the cutting blades 15 and 16, with the upper end of the belt 24 terminating above the belt 19 at such point as to discharge on the belt 19 irrespective of the position of the swinging frame 18.

The hopper 22 is provided with a drop closure 25, hinged at 26 to swing downwardly, and having a rearwardly extending arm 27, which is connected by a link 28, to a crank 29, on a shaft 30, carried in a bearing 31 supported on the hopper 22. Mounted on the shaft 30 is a gear 32, which meshes with a pinion 33, on a horizontally extending shaft 34; the outer end of which is fitted with a pinion 35, meshing with a normally loose gear 36, on a vertically-extending revoluble shaft 37 mounted in suitable bearings on the frame 10; the shaft 37 is provided with a gear 38 fixed thereon, which meshes with a pinion 39, connecting with a sprocket 40, through a short shaft 40ª mounted in the bearing carried by the frame 10.

The sprocket wheel 40 is engaged by a sprocket chain 41, which passes around a sprocket wheel 42, mounted on a clutch shaft 43, carried on the frame 10, and the clutch shaft 43 is fitted with a sprocket wheel 44, engaged by a sprocket chain 45, passing around a sprocket wheel 46 attached to the wheel 14, and 13 of the harvester running gear.

Loosely mounted on the shaft 37 is a gear 47, which meshes with a pinion 48, connecting with the sprocket wheel 49 to a short shaft 50, mounted in a bearing 51, carried by a bracket 52, attached at one end to the hopper 22 and pivotally connected to the shaft 37 at its opposite end. The sprocket wheel 49 engages a sprocket chain 53, which extends upwardly and passes around a sprocket wheel 54, on the roll 20, in such manner that the conveyer belt 19 will be rotated on rotation of the gear 47 when the latter is clutched to the shaft 37 and while such shaft is rotating.

The gears 36 and 47 are formed with hubs 55 and 56 respectively, which extend toward each other and have clutch teeth 57 formed on their ends adapted to be engaged by corresponding teeth formed on the ends of a clutch sleeve 58, reciprocally mounted on the shaft 37 intermediate the hubs 55 and 56, as particularly shown in Fig. 2; the clutch sleeve 58 being adapted to be positioned out of engagement with either of the gears 36 and 47 or to be alternately engaged therewith. The clutch sleeve 58 is normally held in engagement with the gear 47 by means of a lever 59, which pivotally connects therewith and is pivoted at 60, on a hanger 61, carried by the stationary, horizontally extending frame 17. The outer end of the lever 59 is engaged by a cam groove 62, formed on a disk 63, on a shaft 64, carried in suitable bearings supported on a rigid portion of the frame 17. The shaft 64 is provided with a pinion 65 which connects with a sprocket wheel 66, to a short shaft 66$^a$; the sprocket wheel 66 being normally engaged by the sprocket chain 41. The gear 36 is normally held against rotation while the clutch sleeve 58 is out of engagement therewith by means of a spring pressed locking pawl 67, pivoted at 68 on a rigid portion of the frame 10; the pawl 67 having an upstanding ear 69 provided with a cam face adapted to be engaged by a lug or projection 70 on the clutch sleeve 58 to force pawl 67 out of engagement with ratchet teeth 67′ on hub 55, as the latter is advanced into engagement with the gear 36. The sprocket chain 41 serves as a driver for the conveyer belts 23 and 24, and for that purpose is directed around sprocket wheels 75 and 76 and in operative engagement with sprocket wheel 76$^a$ on the rolls, around which the upper portions of the conveyer belts 23 and 24 pass.

As a means for swinging the pivoted frame 18, the latter is here shown as provided with a pair of cables 77 and 78, which are secured to the opposite sides of the pivotal point 79 of the swinging frame 18, and extend forwardly around the edges of the conveyer belts 23 and 24, and are secured to the opposite sides of a segment 79′, pivoted on a rigid portion of the frame 10 at a point near the operator's seat 80. The segment 79′ is fitted with a handcrank 81, carrying a locking pawl 82 adapted to engage sprockets or teeth 83 on a fixed segment 84, whereby the pivoted segment may be locked to hold the swinging frame 18 and the hopper 22 thereon in any desired position. As such locking ports and segments are extensively used and well known, and the specific construction thereof is not a feature of my invention, the details thereof are not shown in the drawings. As gears 35 and 48 are secured to hopper 22 which may be swung concentric to shaft 37 and mesh respectively with gears 36 and 47 on said shaft, the hopper closure 25 and belt 19 will be operated in any position in the hopper 22.

In the operation of the invention, as the harvester is advanced the beans are severed by the cutting action of the blades 15 and 16, whereupon they are engaged by the conveyer belts 23 and 24, which are moved in the direction indicated by the arrow $a$ in Fig. 1; the conveyer belts 23 and 24 discharging the beans on to the conveyer belt 19, carried by the pivoted frame 18. The frame 18 is disposed in any desired position, according to the point at which it is intended to discharge the bean stalks, being positioned rearwardly of the machine, as shown in Figs. 1 and 5, when the stalks are to be stacked behind the machine as it advances. When it is desired to stack the beans to one side of the harvester, the pivoted frame 18 is swung by means of the handcrank 81 and its connections to the swinging frame to any position; the frame 18 turning on the pivot 79, with its outer portion supported on a segmental track 85, carried by the rigid horizontal frame 17.

As the harvester advances the cam 63 is rotated, and during the major portion of its revolution it operates on the lever 59 to maintain the clutch sleeve 58 in engagement with the gear 47, so that the latter will revolve and drive the conveyer belt 19 on the swinging frame 18; the cam-groove 62 on the cam disk 63 being formed for a greater part of its length concentric with the shaft 64. The wall 86 of cam groove 62 extends inwardly as shown in Fig. 4 of the drawings, which on engagement with the end of the lever 59, operates to rock the lever to shift the clutch sleeve 58 downwardly and into engagement with the gear 36. The clutch sleeve 58, on movement into engagement with the gear 36, operates, through the lug 70, to disengage the locking pawl 67, so that rotation of the gear 36 will be effected on engagement with the clutch sleeve 58 therewith. The rotation of the gear 36 operates to drive the gear 32, through the shaft 34 and the pinions 33 and 35. Rotation of the gear 32 revolves the crank 29 and thereby operates, through the link 28 and frame 27, to rock the hopper closure 25 downwardly to discharge the contents of the hopper therefrom. On the crank 29 and gear 32 making a complete revolution, the hopper closure 25 is rocked to its open and closed position. Immediately upon the closure 25 being restored to its closed position, the cam 63 operates on the arm 59 to withdraw the clutch sleeve 58 out of engagement with the gear 36. The locking pawl 67, previously held out of engagement with the teeth on the hub 55, will then be restored into engagement therewith and will operate to lock the gear 36 against rotation and thereby hold the hopper closure 25 in its closed position until it is again actuated by the cam 63.

Suitable mechanism may be employed for throwing the various driving parts out of their operative connections with the running gear wheels 13 and 14, as occasion may require, and any desired construction may be employed for raising and lowering the cutting blades 15 and 16 to dispose them out of their operative positions.

What I claim is:

1. In a harvester, the combination of a wheeled frame, a hopper mounted on said frame, a closure for said hopper, a shaft, a gear loosely mounted on said shaft, means connecting with said gear for operating the hopper closure, means for rotating said shaft by the movement of the wheeled frame, a clutch keyed on said shaft, and means controlled by the shaft rotating means, whereby the clutch is engaged with the gear at predetermined intervals to open and close the hopper closure.

2. In a harvester, the combination of a wheeled frame, a hopper mounted on said frame, a closure for said hopper, a shaft, a gear loosely mounted on said shaft, means connecting with said gear for operating the hopper closure, means for rotating said shaft by the movement of the wheeled frame, a clutch keyed on said shaft, means controlled by the shaft rotating means, whereby the clutch is engaged with the gear at predetermined intervals to open and close the hopper closure and means for holding the hopper closure in its closed position, adapted to be operated by the engagement of the clutch with the gear to release same.

3. In a harvester, the combination of a wheeled frame, a swinging frame pivoted thereon, a hopper carried by said swinging frame, a closure for said hopper, a conveyer belt mounted on said swinging frame, a shaft, means for rotating said shaft by the movement of the wheeled frame, a pair of loose gears on said shaft, a clutch keyed on said shaft adapted to be alternately moved into engagement with said gears, means operated by one of said gears for operating the conveyer belt, and means controlled by the other gear for operating the hopper closure.

4. In a harvester, the combination of a wheeled frame, a swinging frame pivoted thereon, a hopper carried by said swinging frame, a closure for said hopper, a conveyer belt mounted on said swinging frame, a shaft, means for rotating said shaft by the movement of the wheeled frame, a pair of loose gears on said shaft, a clutch keyed on said shaft adapted to be alternately moved into engagement with said gears means operated by one of said gears for operating the conveyer belt, means controlled by the other gear for operating the hopper closure, and means for shifting said clutch at predetermined distances of travel of the wheeled frame.

5. In a harvester, the combination of a wheeled frame, a swinging frame pivoted thereon, a hopper carried by said swinging frame, a closure for said hopper, a conveyer belt mounted on said swinging frame, a shaft, means for rotating said shaft by the movement of the wheeled frame, a pair of loose gears on said shaft, a clutch keyed on said shaft adapted to be alternately moved into engagement with said gears, means operated by one of said gears for operating the conveyer belt, means controlled by the other gear for operating the hopper closure, means for shifting said clutch at predetermined distances of travel of the wheeled frame, means for normally locking the closure in its closed position, and means controlled by said clutch for releasing same.

6. In a harvester, a pivoted frame, a hopper carried thereby, a hinged closure on said hopper, a crank, a link connecting said crank with said closure, a shaft, means for rotating said shaft by the movement of the harvester, a loose gear on said shaft, connections between said gear for rotating said crank whereby the hopper closure may be operated irrespective of the swinging movement of the frame, and a clutch keyed on said shaft adapted to be thrown in and out of engagement with said gear to operate the hopper closure.

7. In a harvester, a pivoted frame, a hopper carried thereby, a hinged closure on said hopper, a crank, a link connecting said crank with said closure, a shaft, means for rotating said shaft by the movement of the harvester, a loose gear on said shaft, connections between said gear for rotating said crank whereby the hopper closure may be operated irrespective of the swinging movement of the frame, a clutch keyed on said shaft adapted to be thrown in and out of engagement with said gear to operate the hopper closure, and means controlled by the movement of said harvester for operating said clutch.

8. In a harvester, a pivoted frame, a hopper carried thereby, a hinged closure on said hopper, a crank, a link connecting said crank with said closure, a shaft, means for rotating said shaft by the movement of the harvester, a loose gear on said shaft, connections between said gear for rotating said crank whereby the hopper closure may be operated irrespective of the swinging movement of the frame, a clutch keyed on said shaft adapted to be thrown in and out of engagement with said gear to operate the hopper closure, means controlled by the movement of said harvester for operating said clutch means engageable with said gear for locking the hopper closure in its closed position, and means operable by said clutch for releasing the gear-locking means.

In witness that I claim the foregoing I have hereunto subscribed my name this 20th day of January, 1915.

MARTIN L. BOYD.

Witnesses:
HENRIETTA E. WORKMAN,
MARGUERITE BATES.